United States Patent Office 2,711,483
Patented June 21, 1955

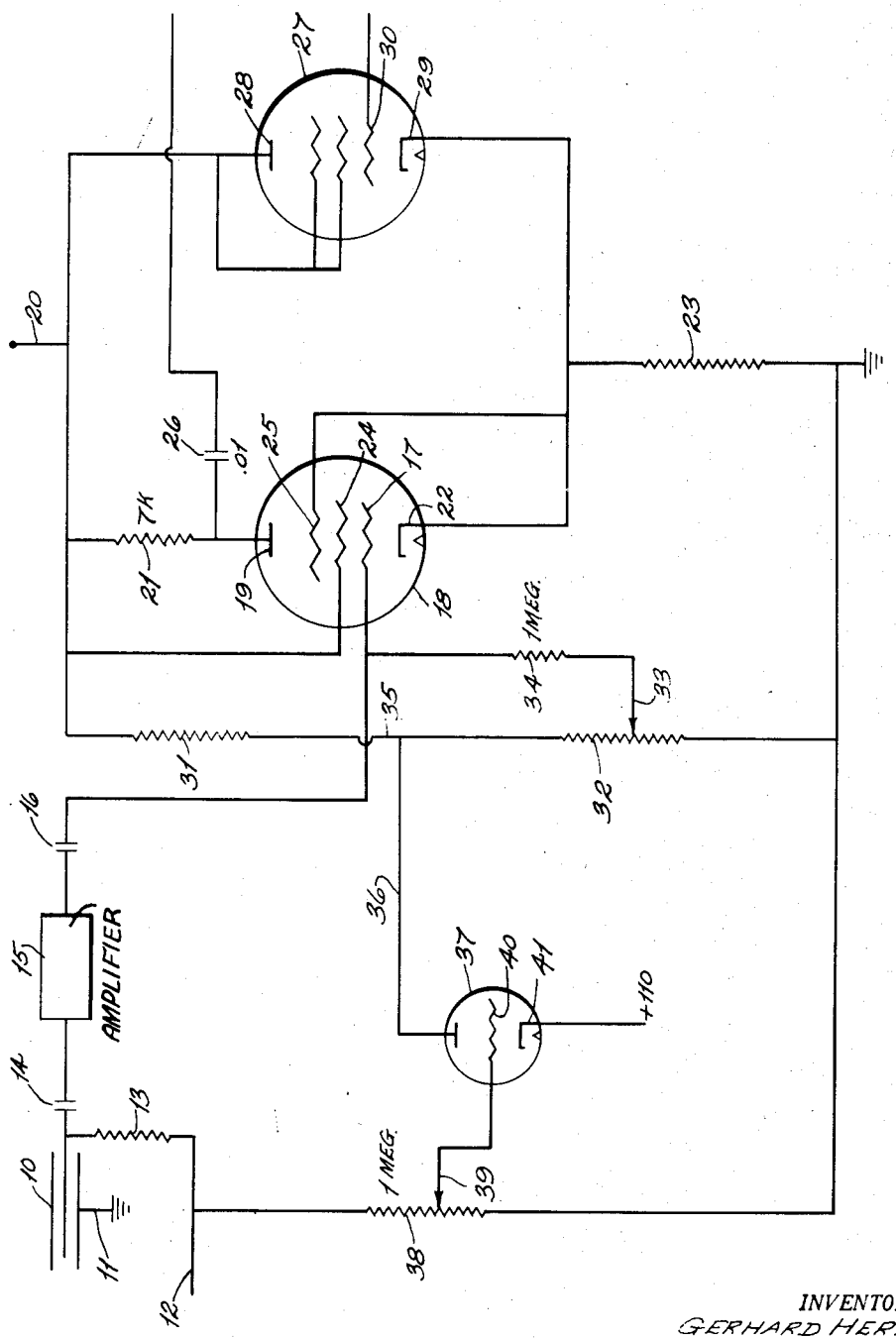

2,711,483

DISCRIMINATOR FOR PROPORTIONAL COUNTERS

Gerhard Herzog, Houston, Tex., assignor to The Texas Company, New York, N. Y., a corporation of Delaware Application February 24, 1950, Serial No. 145,946

2 Claims. (Cl. 250—83.6)

The present invention relates to the operation of radiation detectors of the counter type and more particularly to methods and circuits for the operation and control of such radiation detectors in the range in which they operate as proportional counters. The present invention is particularly intended for use in applications in which the detector is subjected to radiations of varying types and in which it is desired to select and indicate or record responses due to certain types of radiation while eliminating those due to other types. Thus the invention is particularly applicable to the discriminatory indication or recording of the intensity of radiation due to alpha particles or to alpha particles and protons in the presence of radiation due to beta particles or gamma rays. The invention may be employed, for example, in what is known as neutron well logging, in which it is desired to indicate or record the intensity of the scattered slow neutron radiation from structural formations bombarded by neutrons while eliminating or suppressing responses to gamma rays coming directly from the radiation source or being scattered by the surrounding material and also those due to natural or induced gamma rays from the formations.

In connection with the present invention, the detectors employed are of the counter or pulse producing type and are operated in a range of applied voltage in which the size or amplitude of the pulses varies with the initial ionization caused by the radiation or particle producing the pulse; i. e., in what is known as the "proportional counter" range. When slow neutrons are to be detected, the counter is sensitized so that the slow neutrons or a certain proportion thereof passing through the field in which the counter is located will produce ionizing particles. Such sensitization is effected, for example, by coating the cathode elements of the detector with boron or lithium compounds, for example, boron carbide, or by employing within the detector a vapor or gaseous filling which includes boron fluoride. When so sensitized, bombardment with slow neutrons will cause the production of alpha particles from the isotopes of the boron or lithium compound used for sensitizing the detector.

The detector is at the same time sensitive to gamma rays, bombardment with which causes emission of beta particles. Thus the detector produces pulses as a result of the impingement of both slow neutrons and gamma rays. A detector suitable for use in accordance with the present invention is shown in the U. S. Letters Patent No. 2,462,471 granted to K. C. Crumrine, February 22, 1949.

It is frequently desired to separately indicate or record the responses or pulses due to slow neutrons while eliminating the effect of those due to the gamma rays. Since the alpha particles resulting from slow neutron bombardment produce a greater initial ionization than the beta particles resulting from gamma ray bombardment, the pulses resulting from the action of the slow neutrons are of greater size or amplitude than those resulting from the action of gamma rays when the detector is operated in the proportional counter range; that is, under applied voltages below those of the operating range of the Geiger-Mueller counter, in which the size of the pulses becomes substantially independent of the initial ionization of the particles producing them.

Difficulty arises in the use of radiation detectors in the proportional counter range and particularly in such discriminatory use as is hereinbefore referred to, in that such counters are sensitive to even small changes in voltage applied across the electrodes of the detector, such changes resulting both in changes of pulse size or amplitude and in the number of pulses produced in a field of given intensity of radiation. In accordance with the present invention, the operation of the detector and the discriminatory action of the circuits associated with it are stabilized at a predetermined level irrespective of ordinary fluctuations or changes in the voltage applied to the detector.

In accordance with the present invention, the detector is associated with an amplifier channel or circuit in which, preferably after direct linear amplification of the pulses derived from the detector, the pulses of lesser amplitude than those due to the alpha rays are eliminated by control of the bias voltage on the control grid of one of the tubes in the amplifying circuit, generally a tube receiving positive pulses, produced by the detector which have been linearly amplified. The grid bias of this tube may be pre-set so as to eliminate pulses with an amplitude less than a particular value at the normal and desired operating voltage at the counter, which may be, for example, 1100 volts. Assuming a constant neutron flux, if the voltage on the counter be increased somewhat, say to 1110 volts, the amplitudes of the pulses formed within the counter as well as the number of detectable pulses is increased. So likewise, if the voltage on the counter should decrease somewhat, say to 1090 volts, there will be a decrease in amplitude and number of pulses generated within the counter.

In accordance with the present invention, the number of pulses passed by the discriminating amplifier is held constant irrespective of changes in voltage on the counter, assuming a constant neutron flux; or in other words, the changes in voltage are automatically compensated for in the operation of the discriminating system. This is effected by automatically changing the grid bias on the discriminating amplifier with changes in voltage on the counter.

In accordance with the present invention, the necessary change in the grid bias of the discriminator tube is effected by separately controlling the voltage applied to the cathode of the discriminator tube and that applied to the grid and varying the voltage applied to the grid inversely as a function of changes in the high voltage applied to the detector.

The invention will be fully understood from the following description of a circuit embodying the invention, as illustrated schematically in the single figure of the drawings.

In the drawing, the numeral 10 indicates a detector, which may suitably be of the type described in the Crumrine Patent No. 2,462,471, above referred to, and which is sensitized so that it responds to slow neutron bombardment. It is shown schematically and, as is apparent, may be a single or multiple detector. The cathode of the detector is shown as being grounded through the conductor 11. The necessary voltage for operation of the detector is supplied from a suitable high voltage source through the conductor 12 and the resistor 13.

As has been pointed out above, the detector is operated with the applied high voltage across its electrodes of an order such that it acts as a proportional counter. Thus, for a detector of the type illustrated in the prior Crumrine application above referred to, this voltage may be in the order of 600 to 1200 volts. In the circuit illustrated and described herein, the intended range of operation is in the order of 1100 volts. The gamma rays which cause the emission of beta particles in the detector result in pulses of smaller magnitude; and slow neutrons, which cause the emission of alpha particles from the sensitizing material used in the detector, produce pulses of larger magnitude.

The pulses which are produced within the detector appear at the anode as negative pulses and are transmitted through coupling condenser 14 to an amplifier or amplifying train indicated at 15, in which they are linearly amplified and from which they are transmitted as positive amplified pulses through coupling condenser 16 to the grid 17 of the discriminating amplifier 18. Suitable means for linearly amplifying and reversing the pulses from the detector are shown, for example, in the application of Crumrine, Serial No. 676,165, filed June 12, 1946, which matured as U. S. Patent No. 2,557,636. A suitable discriminator circuit is illustrated in the righthand portion of the figure, in which means are provided for stabilizing the voltage on the cathode of the discriminator tube. Such a circuit is illustrated, for example, in the paper by W. H. Jordan and P. R. Bell, Review of Scientific Instruments, volume 18, page 703 (October 1947).

The tube 18, as used in the discriminator circuit, may be an amplifying tube having a high gain, such as a 6AC7 tube. A suitable source of positive voltage for the plate 19 of the tube 18 may be connected to the conductor 20. The voltage for its operation is applied to the plate 19 through the resistor 21. The cathode 22 of the tube 18 is connected to one end of a resistor 23, the other end of which is grounded. The screen grid 24 of tube 18 is connected directly to the source of voltage applied to the plate 19. The suppressor grid 25 is maintained at cathode voltage. By means hereinafter described, the control grid 17 of the tube 18 is maintained at a voltage negative to that on the cathode 22, this negative or bias voltage being such as to prevent the tube from delivering pulses other than those resulting from the production of alpha particles in the detector produced by neutron bombardment. The output of the tube 18 is delivered through coupling condenser 26 to any suitable amplifying, integrating, recording or counting device, not shown.

In order to maintain the cathode voltage of the discriminator tube 18 constant a similar tube 27 is placed in parallel to it, being connected between the source of voltage for the plate circuit of tube 18 and the resistor 23. The plate 28 of tube 27 is directly connected to the conductor 20 upon which the voltage for operation of the plate circuit of the tube 18 is impressed although, if desired, a resistor of lower resistance than resistor 21 may be inserted in the line to the plate 28. The tube 27 is operated as a triode, the screen and suppressor grids being maintained at plate voltage. A suitable triode may be used, if desired. The cathode 29 of tube 27 is connected to the resistor 23. The control grid 30 is connected to a stabilized source of positive voltage, by which there is impressed upon it a voltage but a few volts lower than that upon the cathode. Since both tubes 18 and 27 have the same cathode resistor 23, under normal operating conditions the cathode voltage which is developed by the two plate currents flowing through resistor 23 is substantially constant. The tube 27 has no plate resistor and therefore passes a larger current than the discriminator tube 18 and thereby aids in maintaining the common cathode voltage on the cathodes of the two tubes substantially constant.

In accordance with the present invention, the control of the bias on the control grid 17 of discriminator 18 as a function of the voltage of the source of high voltage applied to the detector anode is effected in the following manner:

A voltage divider is provided, one end of which is connected to a stabilized source of positive voltage and the other end to a point of lower voltage or being grounded, a suitable source of positive voltage therefor being that for the plate circuit of the discriminator tube. In the illustrative circuit shown, a voltage divider is interposed between the source of positive voltage for the plate circuits of the tubes 18 and 27 and the ground, in parallel to those tubes, this voltage divider being made up of the resistor 31 and the potentiometer 32. From a point on the potentiometer 32 a tap 33 is connected through resistor 34 to the control grid 17. The position of the tap 33 on potentiometer 32 is adjusted to give the desired bias voltage relative to cathode 22 on the control grid 17 to eliminate all but the desired pulses. This voltage may suitably be −5 volts in a tube of the character hereinbefore referred to.

From an intermediate point 35 in the voltage divider between the resistor 31 and the potentiometer 32, a conductor 36 leads to the plate of a control tube 37 which may suitably be a triode of relatively low gain such as a 6J5 tube. A potentiometer 38 of high resistance is interposed in a circuit from the source of high voltage for the detector and the ground. From a suitable point on this potentiometer, a tap 39 leads to the control grid 40 of tube 37. The cathode 41 of tube 37 is connected to a stabilized positive source of voltage. The tap 39 on the potentiometer 38 is adjusted so that the control grid 40 of tube 37 is maintained under a slight negative bias relative to the cathode voltage.

As will be apparent, in the circuit as described changes in the high voltage supplied to the detector will be substantially immediately reflected in the operation of the discriminator tube 18. Thus, if it be assumed that this voltage increases, then the voltage at the tap 39 on potentiometer 38 will be increased and since the cathode voltage of tube 37 is constant, the bias on the control grid will be decreased and this will be reflected in an increase in plate current through the tube 37. Thus, if the cathode voltage on the tube 37 be maintained at +110 volts, and the normal voltage on the control grid is 108 volts, the bias on the grid is −2 volts. If now, an increase in voltage at the high voltage source results in an increase in the voltage on the grid to 109 volts, the bias on the tube is decreased to −1 volt and the plate current through the tube 37 will increase accordingly. This will result in a reduction in the positive voltage at the point 35 between the resistor 31 and the potentiometer 32 to which the plate of tube 37 is connected. The voltage at this point may, for example, drop from +140 volts to +130 volts. This produces a corresponding reduction in voltage at the point where the tap 33 contacts the potentiometer 32; for example, from 120 volts to 119 volts. The voltage on the control grid 17 of tube 18 is thereby likewise reduced and since the cathode voltage is made constant at, for example, 125 volts, the grid bias on the tube 18 becomes more negative. It may go, for example, from −5 to −6 volts. This increase in the negative bias on the control grid of the tube 18 results in a reduced output of pulses which may suitably be adjusted to give a substantially constant output of pulses irrespective of small changes in the high voltage applied to the detector, assuming a constant neutron flux.

In a circuit of the character described, in a specific example, the resistance of resistor 38 was 1 megohm. The tube 37 was a 6J5 tube and the cathode was maintained at a constant voltage of +110 volts. The resistance of resistor 31 was 100,000 ohms and that of potentiometer 32 was 50,000 ohms. The resistance of grid resistor 34 was 1 megohm. The tubes 18 and 27 were both 6AC7 tubes and the applied voltage for their plate circuits at the conductor 20 was +300 volts. The resistance of plate resistor 21 was 7,000 ohms; that of the common cathode resistor 23 was 2400 ohms. The cathodes of both tubes were maintained at +125 volts. The control grid 30 of tube 27 was maintained at +120 volts.

With this circuit, with a constant neutron flux and with an applied voltage across the counter of 1100 volts, it was possible to maintain a substantially constant counting rate in the range from 75,000 to 80,000 counts per minute for the output of the discriminator tube with variations of 10 volts in either direction in the voltage applied to the detector anode; that is, in the range from 1090 volts to 1110 volts, whereas in the discriminator circuit without the improved control as hereinbefore described, variations to the same extent in the voltage applied to the counter were directly reflected in variations in the counting rate.

Although the present invention has been described in connection with the specific details of an illustrative example thereof, it is to be understood that these details are not to be regarded as limitations upon the scope of the invention except insofar as included in the accompanying claims.

I claim:

1. In an amplifying and selecting circuit for use with a radiation detector delivering pulses of different sizes resulting from different types of radiation, and including discriminating means comprising an electron discharge tube having its control grid coupled to receive amplified positive pulses derived from such detector and with a voltage on said grid less than that on the cathode of said tube to provide a negative grid bias and thereby cause said tube to select and transmit substantially only pulses of larger amplitude, means for controlling the action of said discriminator and for compensating for changes in its output due to changes in the high voltage impressed upon said detector, said control means comprising a direct current voltage divider to which a constant positive voltage is applied and including at least two resistors in series, at least a part of the resistor at lower voltage being in the control grid circuit of the discriminator tube to provide biasing voltage therefor, and means controlling the voltage impressed on said resistor as an inverse function of the voltage impressed upon the detector to correspondingly vary the grid bias of the discriminator tube, said means comprising an electron discharge tube having its plate connected to said voltage divider at an intermediate point, the control grid of said control tube deriving its voltage from the high voltage applied to the detector, whereby variations in the said high voltage cause inverse variations in the voltage applied to the lower voltage resistor of the said voltage divider and in the voltage on the control grid of the discriminator tube.

2. In an amplifying and selecting circuit for use with a radiation detector delivering pulses of different sizes resulting from different types of radiation, and including discriminating means comprising an electron discharge tube having its control grid coupled to receive amplified positive pulses derived from such detector and with a voltage on said grid less than on the cathode of said tube to provide a negative grid bias and thereby cause said tube to select and transmit substantially only pulses of larger amplitude, means for controlling the action of said discriminator and for compensating for changes in its output due to changes in the high voltage impressed upon said detector, said control means comprising a direct current voltage divider shunted across the power supply of the discriminator tube and including at least two resistors in series, at least a part of the resistor at lower voltage being in the control grid circuit of the discriminator tube to provide biasing voltage therefor, and means controlling the voltage impressed on said resistor as an inverse function of the voltage impressed upon the detector to correspondingly vary the grid bias of the discriminator tube, said means comprising an electron discharge tube having its plate connected to said voltage divider between said two resistors, a resistor connected to the high voltage source for the detector, the grid of said control tube being connected to said resistor and thereby deriving its voltage from the high voltage applied to the detector, whereby variations in the said high voltage cause inverse variations in the voltage applied to the lower voltage resistor of said voltage divider and in the voltage on the control grid of the discriminator tube.

References Cited in the file of this patent

UNITED STATES PATENTS

| | | |
|---|---|---|
| 2,310,342 | Artzt | Feb. 9, 1943 |
| 2,363,361 | Reiskind | Nov. 21, 1944 |
| 2,418,892 | Lord, Jr. | Apr. 15, 1947 |
| 2,443,857 | Herzog | June 22, 1948 |
| 2,465,938 | Shonka | Mar. 29, 1949 |
| 2,496,909 | Eberhard | Feb. 7, 1950 |
| 2,556,074 | Eberhard | June 5, 1951 |